United States Patent
Piechocniski

(10) Patent No.: US 6,644,085 B1
(45) Date of Patent: Nov. 11, 2003

(54) PRINTING PLATE BENDER APPARATUS

(75) Inventor: Peter Piechocniski, Massapequa, NY (US)

(73) Assignee: Halm Industries Co., Inc., Glen Head, NY (US)

(*) Notice: Subject to any disclaimer, the term of this patent is extended or adjusted under 35 U.S.C. 154(b) by 78 days.

(21) Appl. No.: 10/099,003

(22) Filed: Mar. 13, 2002

Related U.S. Application Data

(60) Provisional application No. 60/275,844, filed on Mar. 14, 2001.

(51) Int. Cl.[7] .................. B21K 29/00; B29C 53/84; B29C 35/02
(52) U.S. Cl. .................. 72/128; 72/160; 72/342.94; 29/560; 425/363
(58) Field of Search .................. 72/128, 166, 170, 72/342.94; 29/560; 425/363, 385, 384, 471

(56) References Cited

U.S. PATENT DOCUMENTS

| | | | | |
|---|---|---|---|---|
| 1,372,064 A | * | 3/1921 | Claybourn | 72/406 |
| 1,620,041 A | * | 3/1927 | Smith | 72/128 |
| 1,620,042 A | * | 3/1927 | Smith | 72/149 |
| 1,640,580 A | * | 8/1927 | Smith | 72/128 |
| 2,990,000 A | * | 6/1961 | Mangus | 29/243.57 |
| 3,524,243 A | * | 8/1970 | McKowen | 29/423 |
| 3,897,191 A | * | 7/1975 | Saunders et al. | 425/384 |
| 4,557,684 A | * | 12/1985 | Romine et al. | 72/319 |
| 5,970,774 A | | 10/1999 | Burgess et al. | 72/319 |

OTHER PUBLICATIONS

Mitsubishi Paper Mills Limited catalog, "Mitsubishi PF 107H Plate Bender by Ternes" (undated). 1 Page.
Mitsubishi Paper Mills Limited catalog, "PF–60, PF–60H, PF–110H" (1997). 1 Page.
Mitsubishi Paper Mills Limited catalog, "FACILIS IM Version 3.0 E", Software Specifications, (undated). 6 Pages.
Mitsubishi Paper Mills Limited catalog, "FACILIS IM Light Version 1.0 E", Software Specifications, (1999). 4 Pages.
Mitsubishi Paper Mills Limited catalog, "SDF–ECO 1630 Platesetter" (undated). 4 Pages.
Halm Industries Co., Inc., Plate Bender SJPlus Parts Manual, (Mar. 2000). 2 Pages.

* cited by examiner

*Primary Examiner*—Daniel C. Crane
(74) *Attorney, Agent, or Firm*—Hoffmann & Baron, LLP

(57) ABSTRACT

A printing plate bender for forming shaped edges on a substrate. The printing plate bender generally has a frame, and an elongate mandrel rotatably supported on the frame. The mandrel includes a substrate retainer supported thereon for securing the substrate thereto. The plate bender includes a first substrate guide supported on the frame and disposed adjacent to the mandrel. The printing plate bender further includes a heater disposed in longitudinal alignment with the mandrel and operatively connected with the mandrel. The heater is movably mounted to the frame and upon rotation of the mandrel is movable to a position wherein the heater is in close proximity to the substrate secured to the mandrel in order to assist in forming the desired bend on the printing plate.

33 Claims, 13 Drawing Sheets

PRINTING PLATE BENDER APPARATUS

CROSS-REFERENCE TO RELATED APPLICATION

Priority of U.S. Provisional Application Ser. No. 60/275,844, filed Mar. 14, 2001, entitled Printing Plate Bender Apparatus is hereby claimed, and the disclosure of which is incorporated herein by reference.

BACKGROUND OF THE INVENTION

The present invention relates to the field of printing presses and in particular to an apparatus for forming a printing plate to be secured to a press.

In printing presses, and in particular offset presses, printing is accomplished by transferring ink from an ink roller onto a plate cylinder, which holds a printing plate. The printing plate contains an image to be imparted on a substrate such as a sheet of paper or envelope. Printing plates are typically wrapped around the circumference of the plate cylinder so that it is covers the cylinder's outer cylindrical. During the printing process, the printing plate rolls against a blanket cylinder, which in turn transfers the image to the substrate through an offset printing technique well known in the art. In other known printing processes, the plate cylinder may directly contact the substrate to be printed.

Printing plates are typically designed to be removably secured to the plate cylinder in order to facilitate relatively easy changing of the printing plate. Changing of printing plates is required when a different image is to be transferred to the substrate. Therefore, the use of removable printing plate permits a printing press to be readily configured to print different images. In addition, a printing plate is only good for a certain amount of printings before the image begins to deteriorate. Therefore, after a particular number of printings, a new printing plate can be substituted and additional printings made.

Printing plates are typically made of a metallic material, such as aluminum, having a photosensitive layer on which the image to be printed is fixed. The common method for attaching the printing plate to the plate cylinder is to insert the leading and trailing edge of the plate into a slot extending longitudinally along the surface of the plate cylinder. However, in order to properly attach the printing plate to the plate cylinder the leading and trailing edges are preferably formed with complimentary bends. Metallic plates are especially suited to receiving such bends due to their ability to plastically deform and retain a desired shape.

In order to form a printing plate properly so that the bend is uniform along the entire length of the printing plate, a plate bender is typically employed. One such well-known type of plate bender includes three adjacent rollers. The plate bender has a center mandrel roller that includes a longitudinal slot extending along its surface. The two remaining rollers act as guide rollers and are positioned on opposite sides of the mandrel and in rolling contact therewith. The mandrel is manually rotatable by way of a handle. The slot receives the leading edge of the printing plate, and when the user turns the mandrel the printing plate is forced between the mandrel and one of the surrounding guide rollers. Continued turning of the mandrel bends the plate and forms a crease at a point of the plate adjacent to the mandrel slot, thereby forming a permanent bend in the printing plate. After the plate is bent, the user would then turn the mandrel in the opposite direction so that the printing plate could be removed. The user then places the opposite end, or trailing edge, of the printing plate into the mandrel slot and rotates the mandrel in the opposite direction forming a crease and complimentary bend on the trailing edge.

Such a plate bender as described is extremely useful for bending the leading and trailing edges of a printing plate when the printing plate is made of a metallic material such as aluminum. However, in recent years it has become desirable to form printing plates out of nonmetallic materials, such as plastics. A plastic material found particularly suitable is polyester. One advantage of using the polyester sheets is that a user may create an image on a computer and then transfer the image directly to the polyester sheet. Reduced cost of the polyester plates is also a factor, especially for short printing runs. However, the polyester printing plates are not permanently bent as easily as the metallic sheets. Specifically, the leading and trailing edges of a polyester sheet when only mechanically deformed do not hold the required shape.

Prior art devices exist in order to form the edges of plastic sheets so that they can be secured to plate cylinders. One such device is marketed by Mitsubishi Paper Mills Ltd. These devices, called plate formers, are stand-alone units including a table surface on which a sheet is placed. Actuators are provided to apply mechanical pressure and heat to provide the proper edge configurations. However, these devices are relatively large, expensive machines that take up valuable floor space in a print shop. In addition, these machines are limited in their use since they can only be used with the polyester sheets and are not suitable for use with metallic or aluminum printing plates.

Accordingly, it would be desirable to provide a compact, easy to use plate bender that can effectively form the edges of a plastic printing plate. It would also be desirable to provide a plate bender which can be used to form both metallic and plastic printing plates.

SUMMARY OF THE INVENTION

It is an advantage of the present invention to provide a plate bender for forming a shaped edge on a printing plate that is made of a plastic material.

It is a further advantage of the present invention to provide plate bender having a heating element that forms the desired bend in a plastic printing plate.

It is a further advantage of the present invention to provide a plate bender for forming a shaped edge on a printing plate that is made of a either plastic or metallic material.

It is still a further advantage of the present invention to provide a plate bender that forms permanent bends on plastic printing plates and is easy to operate and is easily portable and requires no additional floor space.

It is yet a further advantage of the present invention to provide a plate bender with a rotatably mounted mandrel and a drive mechanism including a linkage, which moves the heater toward the substrate upon rotation of the mandrel.

In the efficient attainment of these and other advantages, the present invention provides a printing plate bender for forming shaped edges on a substrate including a frame and an elongate mandrel rotatably supported on the frame. The mandrel has a first substrate retainer supported thereon. A first elongate guide roller is rotatably supported on the frame and disposed adjacent to the mandrel. A heater is disposed in longitudinal alignment with the mandrel. The heater is movably mounted on the frame between a first position spaced from the mandrel and a second position wherein the heater is in close proximity to the substrate securable to the mandrel, thereby forming the shaped edge on the substrate. The heater is operatively connected to the mandrel such that rotation of the mandrel causes movement of the heater.

As more specifically described by way of the preferred embodiment, the substrate retainer may be a longitudinally extending slot formed in the mandrel adapted to receive an edge of the substrate. The longitudinal slot is preferably slightly wider than the thickness of the substrate, so that the substrate is closely held in the slot. In the preferred embodiment, the mandrel is operatively connected to the heater by a drive mechanism including an eccentric cam formed on one end of the mandrel and a carrier plate having a cam follower engagable with the cam. The carrier plate is positioned such that when the cam is rotated the heater moves between the first and second position. The cam is preferably connected to the rotational axis of the mandrel such that the amount of rotation of the mandrel is directly proportional to the amount of rotation of the cam. In the preferred embodiment the cam follower is the carrier member which is movably attached to the frame while at the same time being attached to the heater. The carrier member is preferably attached to the end plate of the frame, which is attached to the ends of the elongate mandrel. Preferably there is a handle connected to the mandrel which includes a shaft extending from the end thereof to permit the mandrel to be rotated. The mandrel may also include a second substrate retainer for accommodating a variety of printing plate materials. It is envisioned that either a plastic substrate such as polyester or metallic substrate such as aluminum may be used with the present invention.

Preferably, there is a controller operatively connected to the heater, which controls the amount of time that the heater is energized. The timer may be set to operate the heater for the specified amount of time depending on the substrate that is used. The timer preferably includes an indicator for advising the user when the bend in the substrate has been formed.

A preferred form of the printing plate bender as well as other embodiments, objects, features and advantages of the invention will be apparent from the following detailed description of illustrative embodiments thereof which is to be read in conjunction with the accompanying drawings.

DETAILED DESCRIPTION OF THE PREFERRED EMBODIMENTS

In order to attach a printing plate to a plate cylinder, the leading and trailing edges of the plate are typically formed with complimentary bends so that they may be retainably inserted into a slot in a plate cylinder of a printing press. The desired bends may be formed by the printing plate bender 10 of the present invention shown in FIG. 1. Plate bender 10 imparts the required edge configurations on a substrate, such as printing plates, made out of a variety of materials including plastic and metal. While aluminum has traditionally been the material used to form printing plates, printing plates may now also be formed of non-metallic plastic materials such as polyester. Polyester has certain advantages over aluminum including permitting images to be transferred directly from a computer to the printing plate. In contrast, aluminum plates require the image to first be created and then photographically imparted onto the plate. Polyester plates are also less expensive to produce than metallic plates. The present invention provides a plate bender which forms the edges on non-metallic printing plates.

Figure 1:
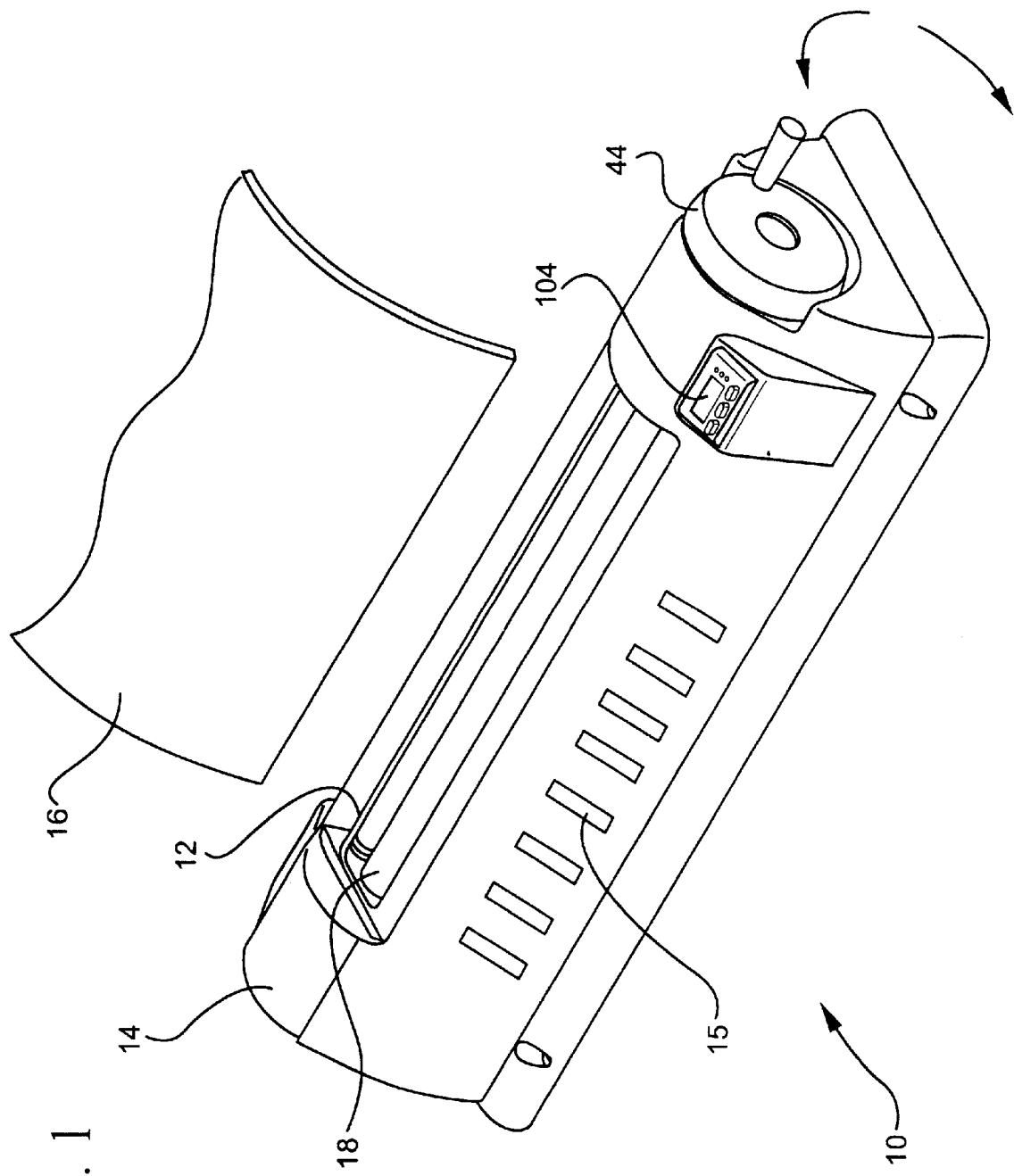
FIG. 1 is a top perspective view of the plate bender of the present invention.
Figure 2:
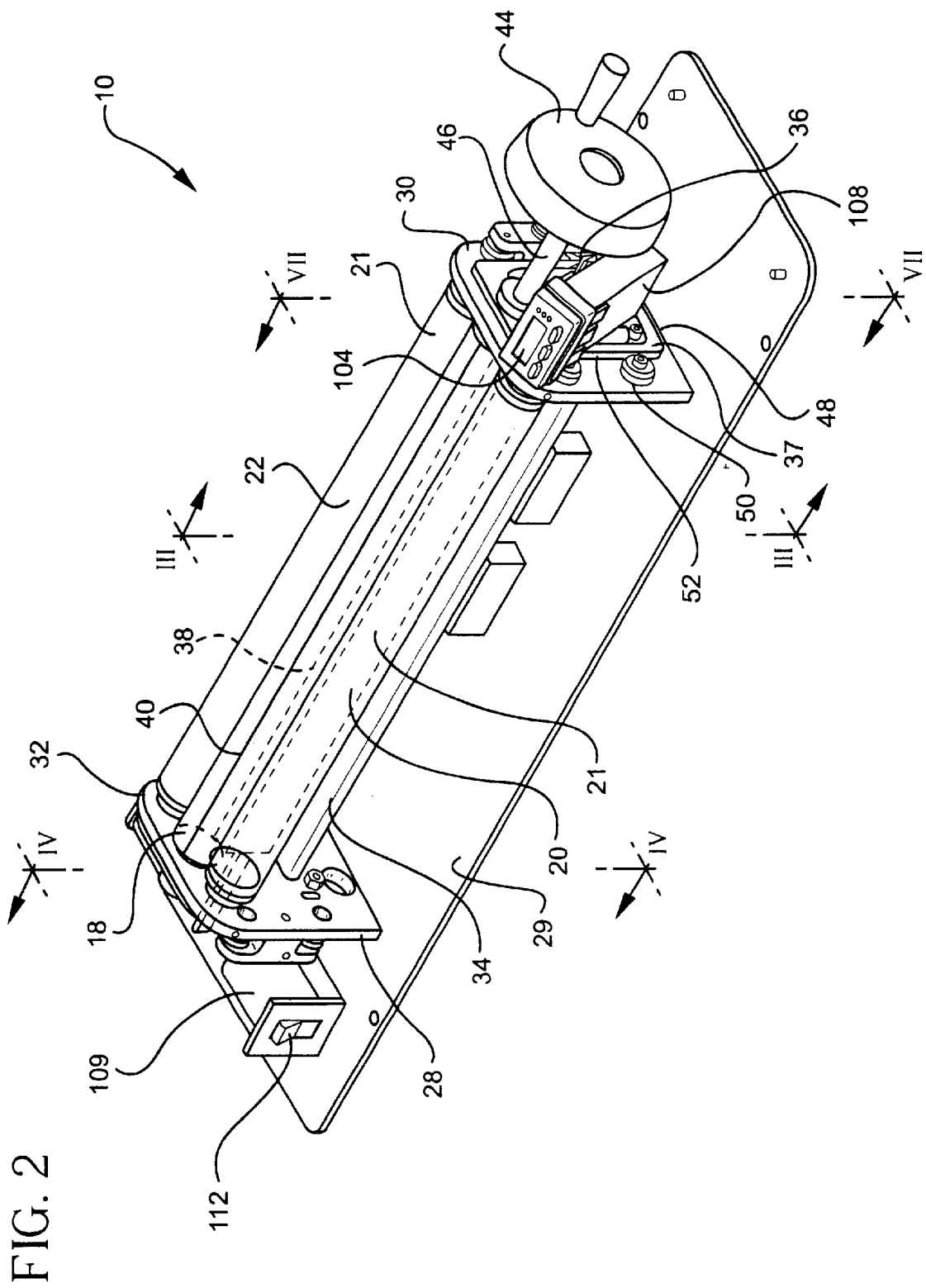
FIG. 2 is a top perspective view of the plate bender of FIG. 1 with the outer housing removed.
Figure 3:
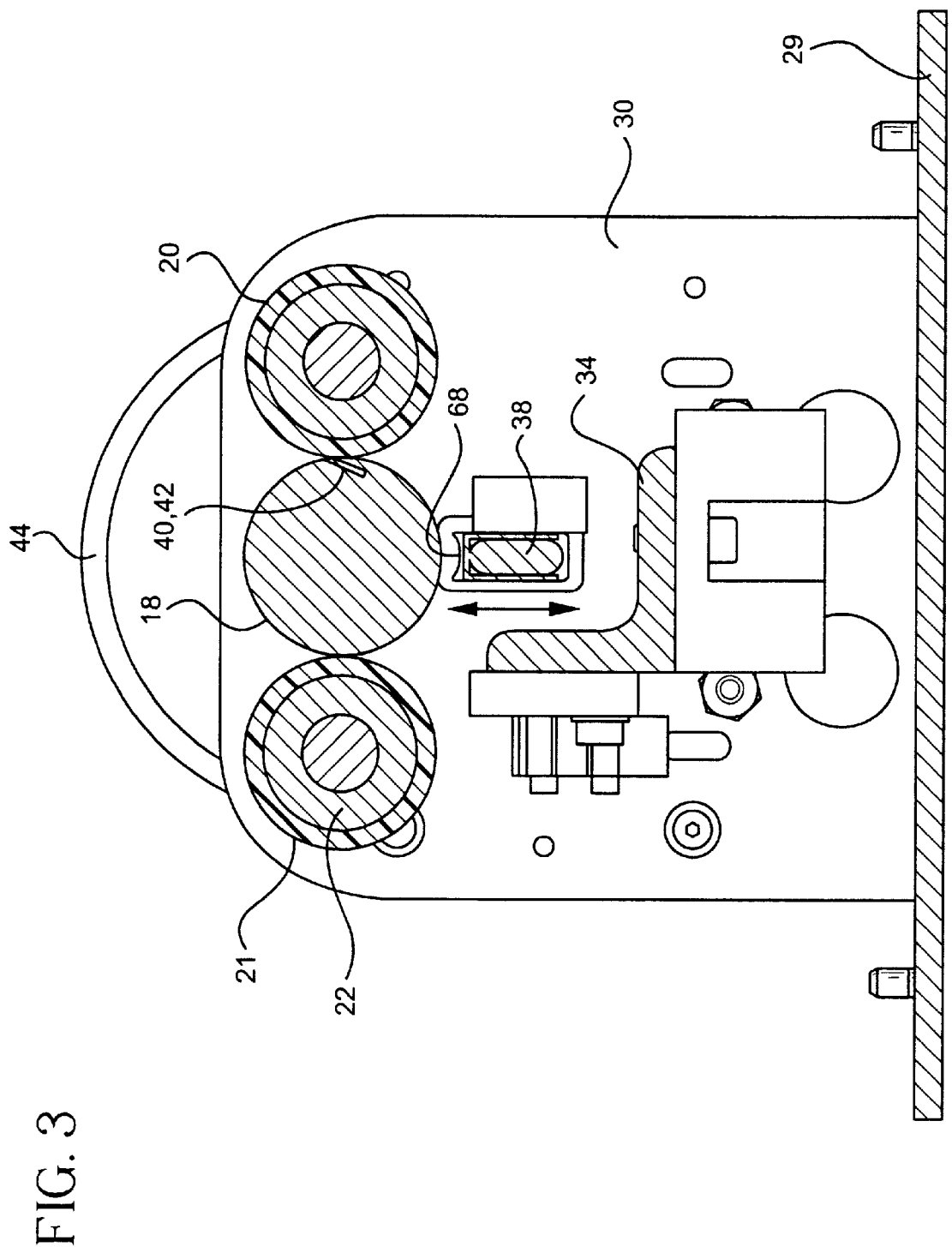
FIG. 3 is a cross-sectional view of the plate bender of FIG. 2 taken along line III—III thereof.

Referring to FIGS. 1–3, plate bender 10 preferably includes an elongate, round mandrel 18 rotatably supported on a frame 28. Rotation of mandrel 18 to which a printing plate 16 is releasably secured, results in formation of the bend along the edge of the printing plate. A movable heater 38 is provided, which engages the printing plate at the appropriate time to form a permanent crease in the edges of plastic printing plates such as those formed of polyester. The printing plate bender 10 further generally includes an outer housing 14 with an opening 12 on the top therein to permit insertion of a printing plate into plate bender 10. Outer housing 14 may include a plurality of vents 15 formed therein to permit heat generated by heater 38 to escape and prevent any thermal damage to the internal components. Plate bender 10 of the present invention is a relatively compact design which is easily portable and easy to store. The device requires no additional floor space and can be set upon any surface for use.

Mandrel 18 is an elongate round member, which may be formed of a hard material, such as steel. Mandrel 18 includes a plate retainer 40 that releasably retains printing plate 16 while the edges of plate 16 are formed. Plate retainer 40 preferably includes a longitudinal slot 42 in the surface of the mandrel 18 having a thickness slightly larger than a typical printing plate so that the plate is closely held within. The unformed leading and trailing edges of plate 16 are individually insertable in slot 42 prior to being operated on by plate bender 10. Slot 42 assists in forming the required bend in the edges of plate 16. It is also within the contemplation of the present invention that plate retainer 40 may include a slot having a mechanical fastener, such as one or more spring clips (not shown) formed within the slot to securely hold a printing plate.

Positioned adjacent to mandrel 18 is a substrate guide which may include a first elongate guide roller 20 which is used to guide plate 16 during the bending process. Substrate guide may also include a second elongate guide roller 22 that may be positioned adjacent to mandrel 18 opposite from first guide roller 20 for assisting in guiding printing plate 16 during the edge bending process. First guide roller 20 and second guide roller 22 may be positioned so that they are substantially on opposite sides of the mandrel 18 and are in rolling engagement with mandrel 18. In the preferred embodiment, the first guide roller 20, second guide roller 22 and mandrel 18 are positioned in the same linear plane as each other so that they are all level with one another. The surfaces of guide rollers 20 and 22 may be covered by a resilient material 21 such as nylon, which can deform in order to permit plate 16 to pass between guide rollers 20 and 22, and mandrel 18. In an alternative embodiment (not shown), substrate guide may include a fixed member such as a concave surface position adjacent to mandrel 18 that would permit a printing plate to slide past mandrel 18 and substrate guide.

First guide roller 20, second guide roller 22, and mandrel 18 may be rotatably held in position by frame 28. Frame 28 may include first and second end brackets 30 and 32 between which extend guide rollers 20 and 22 and mandrel 18. Frame 28 may also include a rigid longitudinal support member 34 which effectively holds the first end bracket 30 and the second end bracket 32 in position and adds structural rigidity to plate bender 10. Preferably support member 34 is positioned below the guide rollers and mandrel 18 and may have an "L-shaped" cross-section as shown in FIG. 3. Frame 28 may be secured to a base 29, which is securable to outer cover 14. Base 29 may be a relatively planar member, which permits plate bender 10 to be supported on any generally flat surface, such as a table top, during use. It is to be understood that frame 28 could take on a variety of configurations to support the mandrel and rollers.

Figure 4:
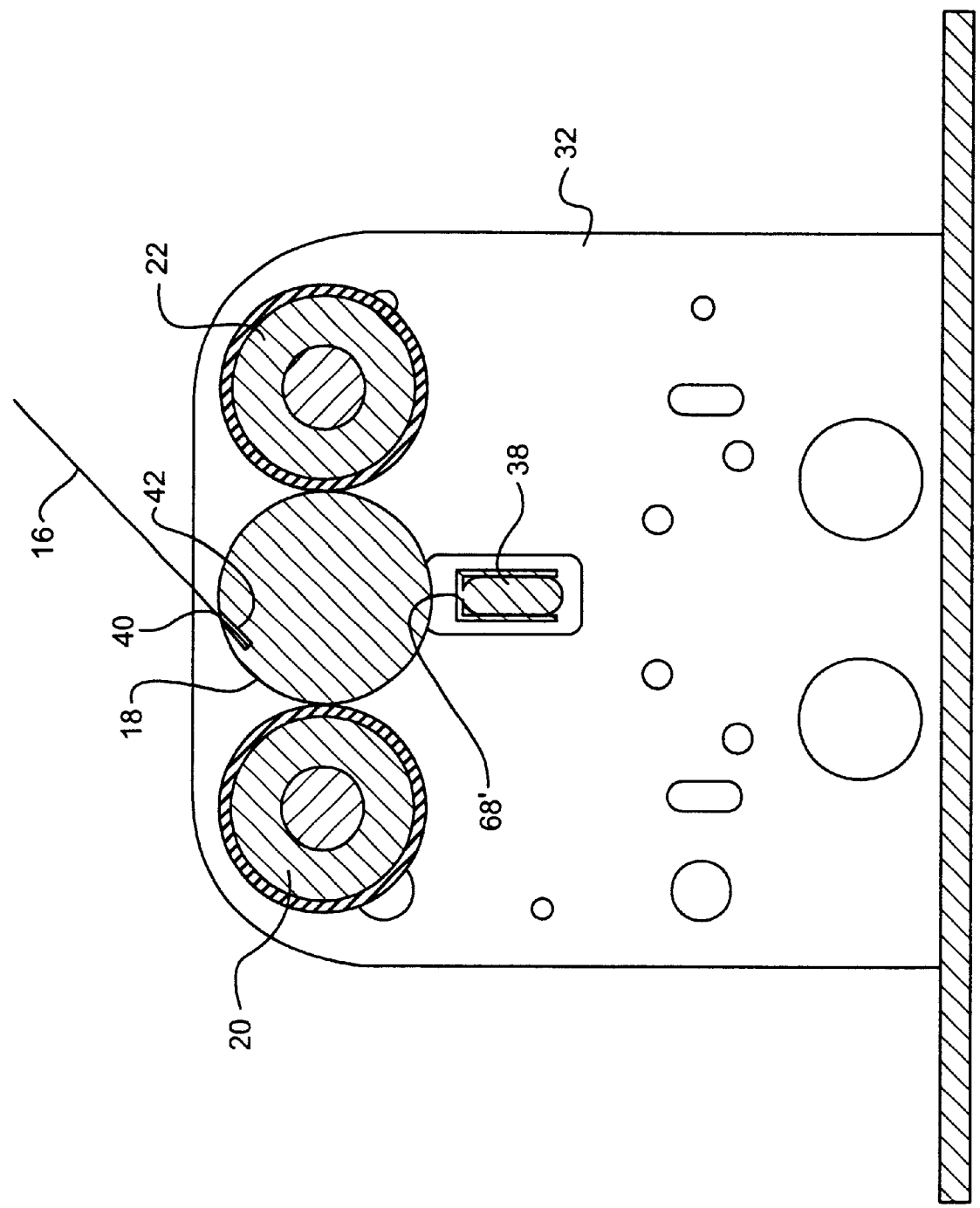
FIG. 4 is a cross-sectional schematic view of the plate bender of FIG. 2 taken along line IV—IV thereof showing the mandrel in an initial position.
Figure 5:
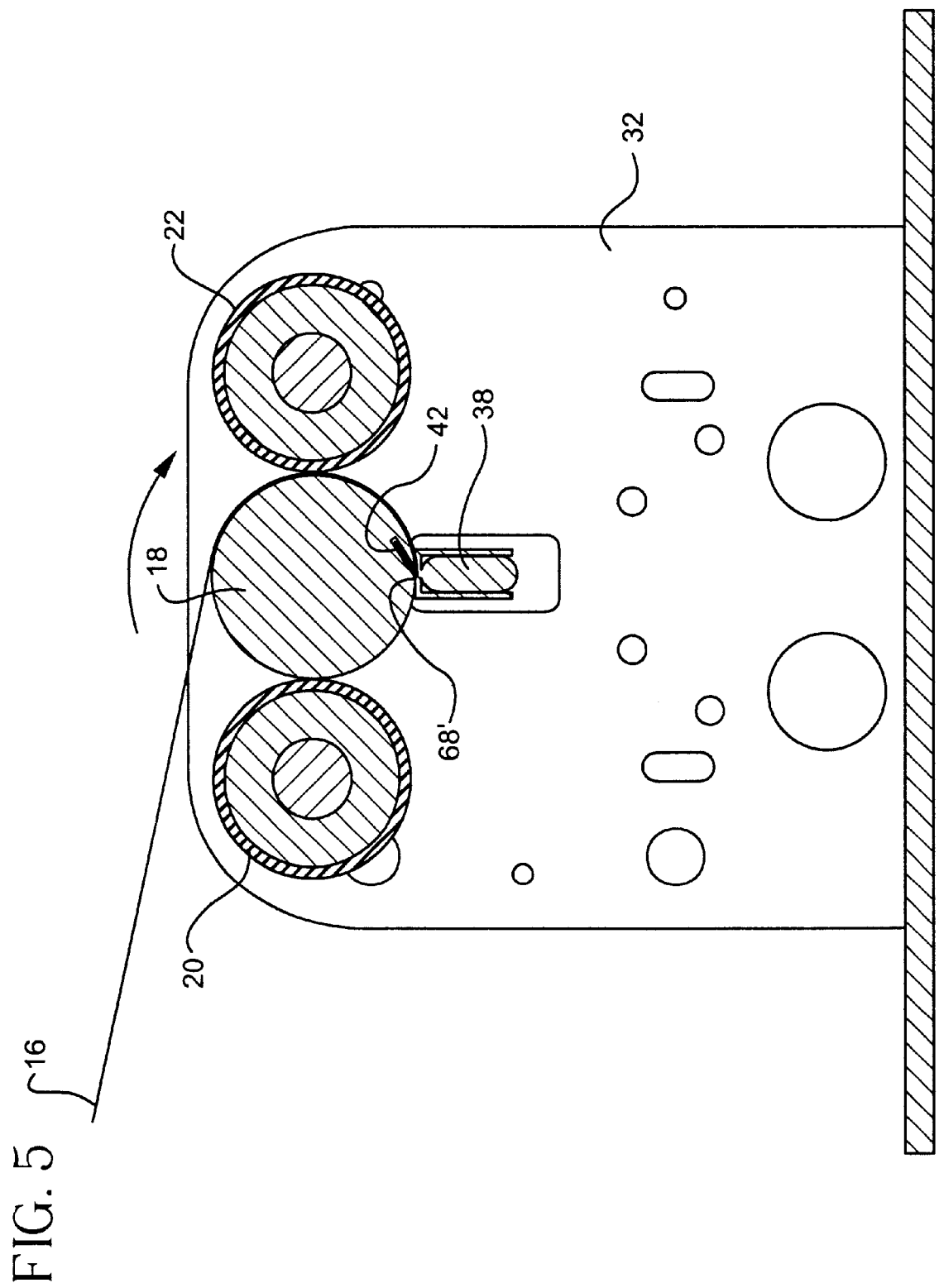
FIG. 5 is a cross-sectional schematic view of the plate bender of FIG. 5 taken along line IV—IV thereof showing the mandrel in the secondary position to form a first edge in a printing plate.
Figure 6:
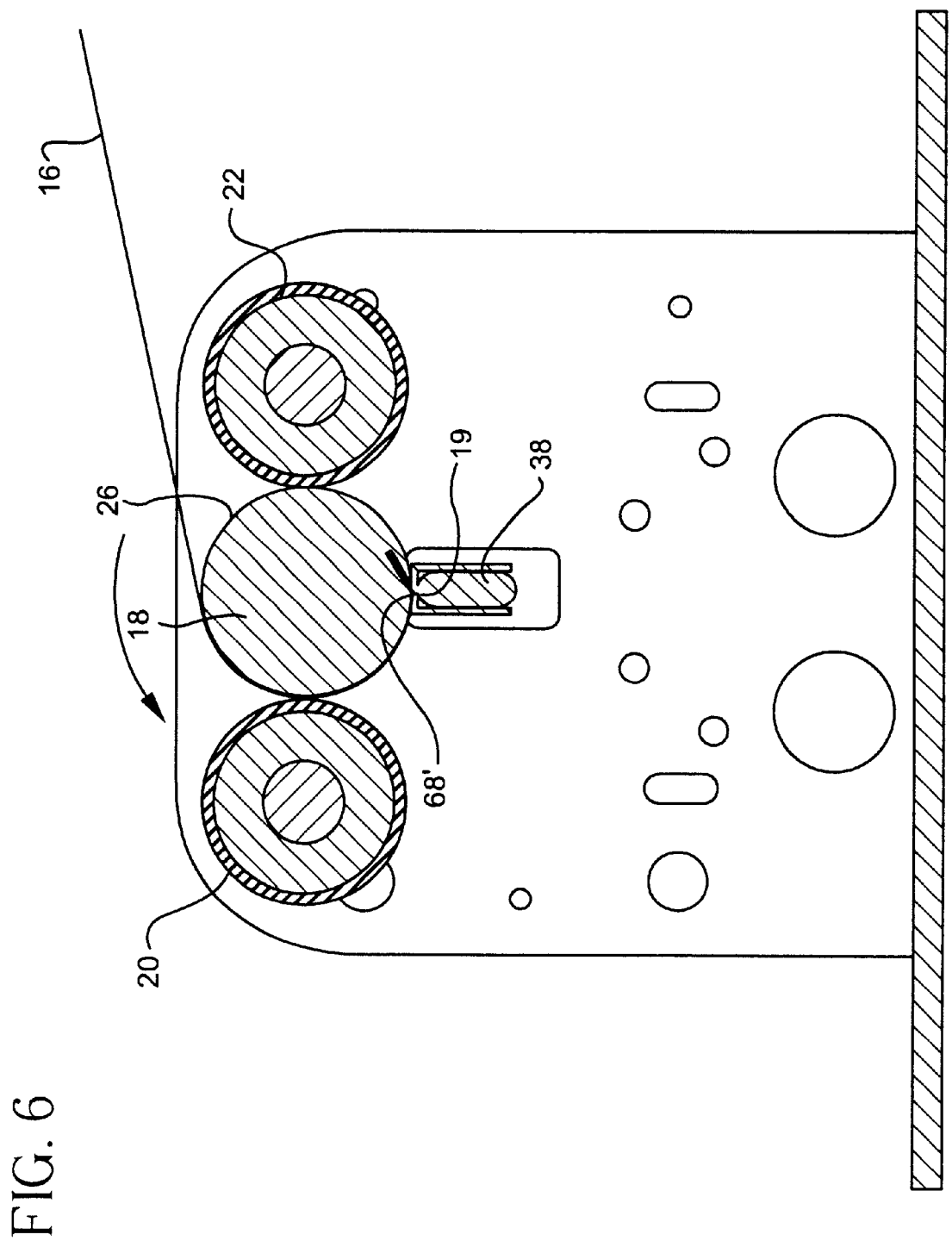
FIG. 6 is a cross-sectional schematic view of the plate bender of FIG. 5 showing the mandrel in the secondary position to form a second edge in a printing plate.

Referring specifically to FIGS. 4–6, in order to form printing plate edges such that they may be secured to a plate cylinder, a printing plate 16 is inserted in sheet retainer slot 42. Mandrel 18 is selectively rotatable in a first and a second direction in order to form the leading edge and trailing edge of the printing plate. The rotation of mandrel 18 pulls printing plate 16 past one of the guide rollers, 20, 22, and bends the end of the plate as shown in FIGS. 5 and 6. With a metal plate material, this action would result in a permanent bend being formed on printing plate 16. However, when a plastic material such as polyester is used, heat is preferably applied to the plate crease area 19 (FIG. 8) to permit the bend to be retained. Pressure may also be applied to the crease area 19 to assist in forming the bend. Accordingly, the present invention includes a heater 38 disposed adjacent to mandrel 18 that is movable into engagement with plate 16 adjacent the crease to assist in forming a permanent bend.

In the embodiment shown in FIG. 3, heater 38 is preferably positioned in longitudinal alignment with, mandrel 18. Heater is selectively movable between a first position spaced from the mandrel and a second position wherein the heater 38 is in close proximity to a printing plate 16 secured to the mandrel 18, wherein the shaped edge on the plate 16 may be formed. Close proximity may include heater abutting plate 16 or being in close, spaced relationship thereto. In the preferred embodiment, heater 38 preferably abuts printing plate 16 in the second position such that heat is directly applied to plate 16 and the pressure from the engagement assists in forming the bend. Alternatively, in the second heater position, heater may be in a close, spaced relationship to plate such that the heat generated works upon plate 16 without physical contact. Heater 38 may include any member having a temperature that can be elevated either directly or indirectly. In one embodiment, heater 38 may include an electrical resistance coil or element that is preferably energized as heater 38 approaches the second heater position and the printing plate 16. Preferably a cartridge-type heater may be employed which includes an electrical resistance coil or element surrounded by an outer casing. Heater 38 may have a top contoured face 68 concave in cross-section so that it substantially corresponds to the shape of the outer surface of the mandrel 18 in order to assist in forming the bend in the edges of printing plate 16. Alternatively, as represented in FIGS. 4–7, the top face 68' may be substantially flat.

Plate bender 10, permits heater 38 to be brought into close proximity to printing plate 16 adjacent where the crease is to be formed. The heat generated softens the plastic or polyester material and allows it to permanently deform. When heater 38 is removed and the plate material cools, a permanent bend of the desired configuration will be set in the edge of the printing plate. In the preferred embodiment, heater 38 is operatively connected to the mandrel such that rotation of mandrel 18 causes movement of heater 38 in and out of close proximity with plate 16. This action may be achieved by way of a drive mechanism 36.

Figure 7:
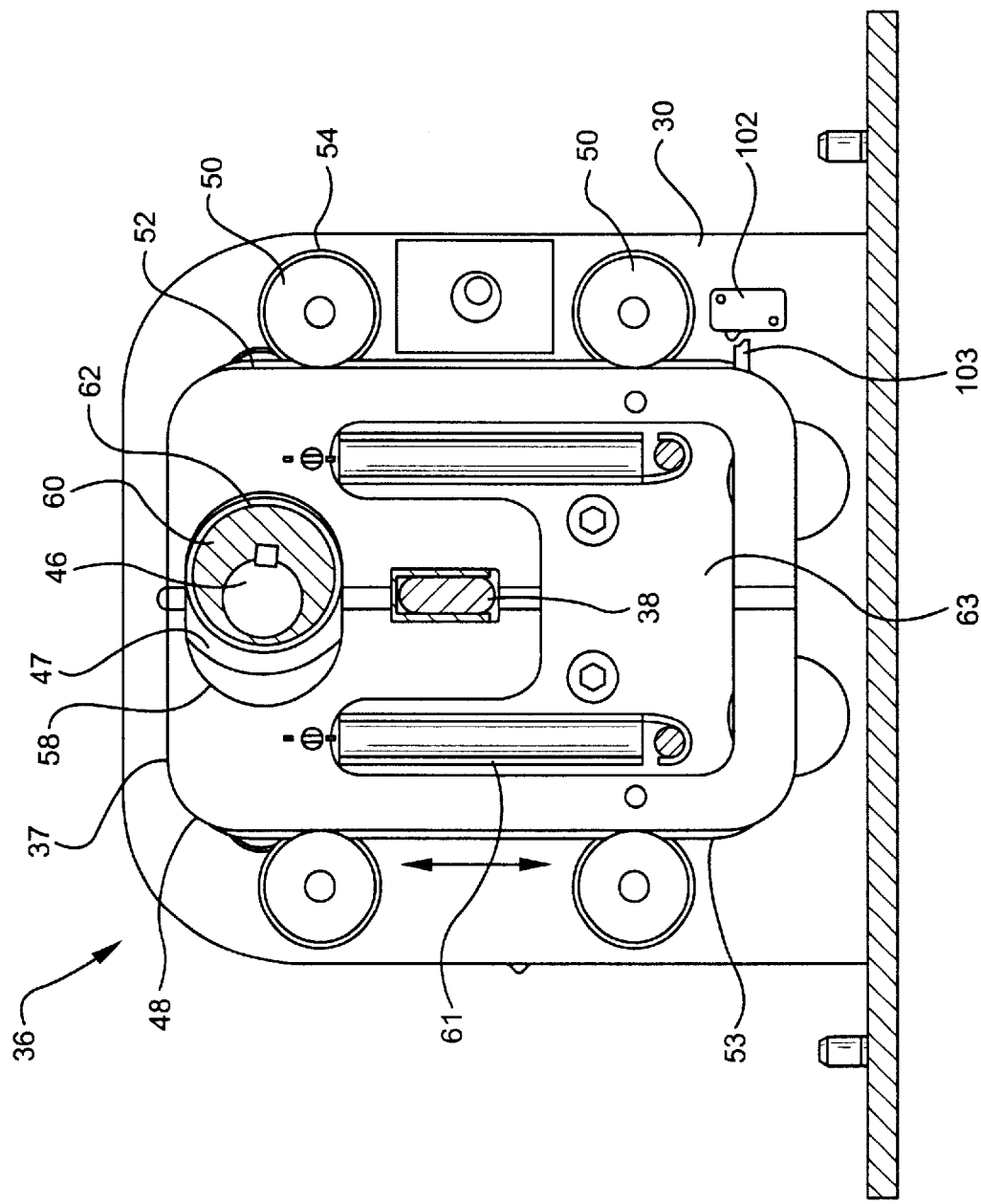
FIG. 7 is a cross-sectional view of the plate bender of FIG. 2 taken along line VII—VII thereof.

Referring to FIGS. 2 and 7, the drive mechanism 36 may include a linkage 37 extending between a drive shaft 46 and heater 38. In the preferred embodiment, linkage 37 includes an eccentric cam 60 disposed on drive shaft 46 and a cooperating cam follower 58 formed on a carrier member 48 attached to heater 38. It is also within the contemplation of the present invention that the drive mechanism 36 could include a variety of mechanical solutions including cooperating gears or the use of belts, as would be known to one skilled in the art.

In the present invention, drive shaft 46 is attached to mandrel 18 and extends through first end bracket 30. Drive shaft 46 may be non-rotatably attached to a handle 44 to facilitate manipulation by a user of plate bender 10. Handle 44 may rotate shaft 46 and mandrel 18 in either a clockwise or counter-clockwise direction. It is also within the contemplation of the present invention that the rotation of the mandrel could be caused by an electric motor governed by the appropriate limit switches (not shown). A user would then only have to insert the printing plate edge into slot 42 and press a button which would cause the mandrel to rotate.

The rotation of handle 44 through linkage 37 also moves heater 38 between its first and second positions. To achieve this movement, heater 38 is preferably mounted between a pair of carrier members 48. Each carrier member is translatably attached to one of the first and second end brackets 30, 32. In the preferred embodiment, carrier members 48 cooperate with rollers 50 which are placed around and are in rolling engagement with outer peripheral edges 52 of the carrier members 48. Rollers 50 preferably have a groove 54 to engage the outer peripheral edge 52 of carrier members 48. In one embodiment of the invention, the outer peripheral edge 52 may have beveled edges to engage rollers 50 so that it may fit in within the groove 54 of the rollers 50. As shown in FIG. 7, the preferred embodiment of the invention has four rollers 50 with two rollers 50 positioned on each side of the carrier member 48. In an alternate preferred embodiment, not shown, carrier members may be guided by flanged bushings acting on the carrier members peripheral edges to permit guided up and down movement of the carrier members.

Referring again to FIG. 7, at least one of the carrier members 48 includes a cam follower 58. Cam follower 58 generally includes an elongated oval-shaped opening 47 positioned on the upper half of carrier member 48 so that drive shaft 46 extends therethrough. Eccentric cam 60 is rotatably fixed about drive shaft 46 so that it rotates with drive shaft 46 upon rotation of handle 44. Eccentric cam 60 is essentially an annular member having drive shaft 46 extend therethrough at a position offset from the cam's center. Eccentric cam 60 is disposed within cam follower 58 and is in working engagement therewith such that rotation of cam 60 causes carrier member 48 and heater 38 attached thereto, to translate between the first and second positions. In the preferred embodiment, a pair of cams 60 and carrier members 48 including cam followers 58 are employed with one disposed adjacent each end plate 30 and 32. Therefore, both ends of heater 38 are driven resulting in a smooth fluid operation upon rotation of mandrel 18.

The preferred embodiment, may also include a biasing device such as a pair of biasing members such as springs 61 extending between carrier members 48 and end brackets 30 and 32 in order to urge carrier members 48 in a downward position. Springs 61 may be located within an interior open portion 63 of carrier members 48 as shown in FIG. 7. Alternatively, carrier members 48 may be formed without the interior opening (not shown), in which case spring 61 would be disposed adjacent to a surface of carrier members 48. This biasing force maintains the carrier members 48 in contact with eccentric cams 60 resulting in a smooth operation.

In operation, when the eccentric cam 60 is rotated so that the longer dimension 62 is pointed in an upward direction thereby pushing on the upper surface of cam follower 58 carrier member 48 is urged upwardly. At the same time heater 38 is moved into the second position by the upward movement of carrier member plate 48. Heater 38 may be also moved back to the first position which is farther away from mandrel 18 by rotating eccentric cam 60 so that the longer dimension 62 is pointing in a downward direction. When eccentric cam 60 is positioned so that the longer dimension 62 is in a downward direction, the bottom surface of the cam follower 58 is pushed in a downward direction. This causes the carrier members 48 and the heater 38 to move in a downward direction away from mandrel 18. The positioning of the eccentric cam on shaft 46 is such that heater 38 reaches its second position when mandrel 18 has been rotated to a point where the crease is ready to be formed. At this point the heat and/or pressure may be applied to printing plate 16 in order to set the crease and permit the printing plate 16 formed from a plastic material to hold its shape.

In an alternative embodiment (not shown), one edge of the carrier member could include a toothed rack and one of the rollers 50 be in the form of a pinion which is geared to drive shaft 46. Therefore, upon rotation of the drive shaft and the mandrel, the carrier member and heater would translate.

Figure 9:
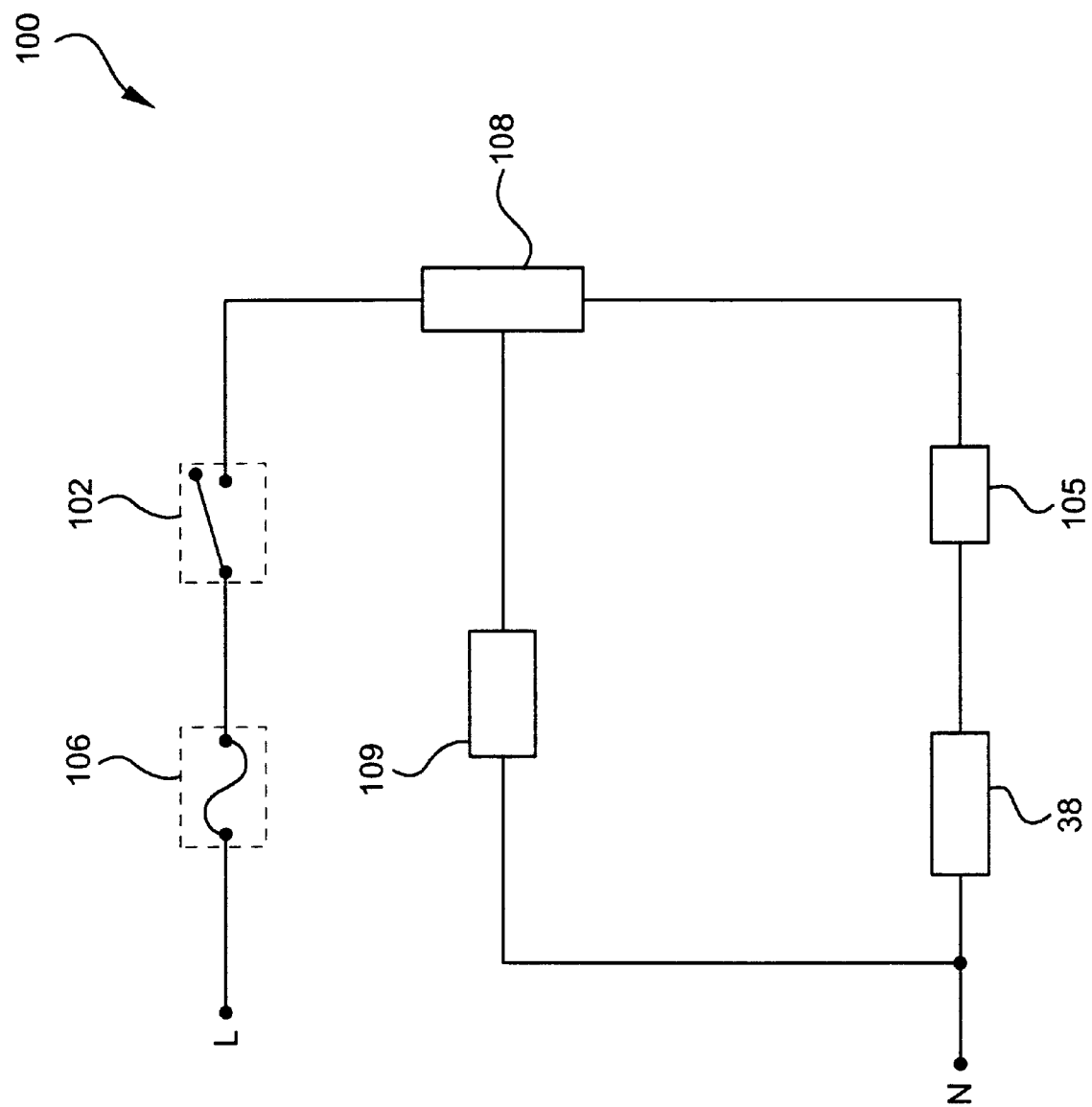
FIG. 9 is an electrical schematic of the control circuit of the present invention.

In order to control the energizing of heater 38, the present invention includes a control circuit 100 shown in FIG. 9. Control circuit 100 may be designed so that heater 38 is automatically energized and de-energized for the appropriate amount of time for the specific printing plate 16. Control circuit 100 may include a thermal controller 108 including a timer that activates the heater for a predetermined amount of time. Control circuit 100 may further include a position sensing switch 102 (FIG. 7) activated by movement of heater 38 such that when heater is moving toward its second position to engage printing plate 16, switch 102 is activated and heater 38 is energized and the timer begins. The preset time may be approximately 10–15 seconds depending on the type of substrate which is being used. Position sensing switch 102 may include a micro-switch or its equivalent that is activated by the carrier members 48 or handle 44 as they are moved with plate 16. Preferably the sensing switch 102 is activated by a pin 103. Control circuit 100 may further include a thermal relay 105 operatively connected between heater 38 and the power source to interrupt power to heater 38 in the event an over-heat situation occurs.

Referring again to FIG. 2, thermal controller 108 may also include a display 104, which indicates to a user the time period they should wait with heater 38 in the engaged second position before returning the mandrel 18 to its initial position and removing the printing plate 16. Thermal controller 108 may count down from the predetermined number and provide a visual and/or audible signal that the heating of printing plate 16 is complete. Preferably, a signal may be sent to an indicator such as a buzzer 109 that is attached to base 29 which alerts a user that the heating sequence is complete. Upon receiving this indication, handle 44 could be turned to the initial position to release printing plate 16. Thermal controller 108 may also be electrically connected to the heater such that when it times out, power to heater 38 is interrupted. Controller 108 may further be programmable to permit the time to be adjusted depending on the specifics of printing plate 16. Such thermal controllers are commercially available and include the Watlow Series 935B. It is within the contemplation of the present invention that a variety of control circuits could be employed to turn the heater on and off at the appropriate time.

Figure 10:
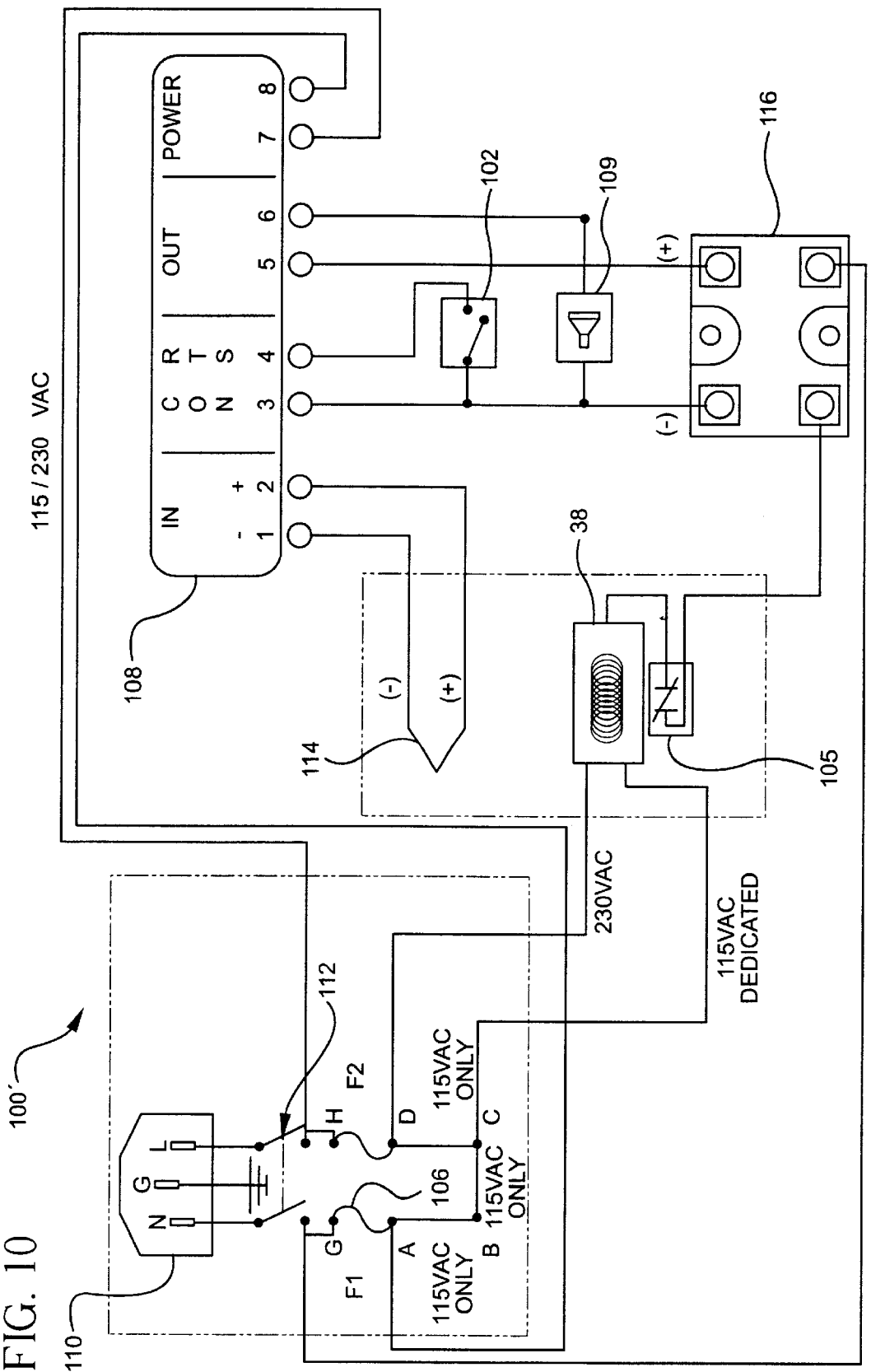
FIG. 10 is an electrical schematic of a preferred embodiment of the control circuit of the present invention.

In the preferred embodiment shown in FIG. 10, the control circuit 100' for the present invention may further include a power input module 110 including an on/off switch 112 which provides power to the unit. Power input module 110 may be capable of handling either 115 or 230 VAC. The supply current from power input module 110 is operably connected to thermal controller 108, as well as to heater 38. The thermal controller is also operably connected to a thermocouple 114 located adjacent heater 38 in order to provide sensed temperature input to thermal controller 108. The thermal controller also includes an output to indicator 109 and to the coil of a normally open relay 116. When sensing switch 102 is activated, power to a relay 116 is supplied resulting in it electrically closing, thereby providing a current to heater 38. As heater 38 warms up, thermocouple 114 sends a signal to thermal controller 108. When a predetermined operating temperature is reached, thermal controller 108 begins to count down the time remaining in the heat cycle. When the timer times out, an indicator is sounded alerting a user that the edge forming process is completed and they can remove printing plate 16 from the mandrel 18. If at any time during the heating cycle, heater 38 exceeds a predetermined maximum temperature, thermal relay 105 will open disrupting the circuit to heater 38.

Operation of the printing plate bender 10 will now be described with reference to FIGS. 4–7. FIG. 4 illustrates the first or initial position of mandrel 18 wherein substrate retainer 40 is positioned in a generally upward direction so that an edge of printing plate 16 may be inserted into the longitudinal slot 42. In this initial position, heater 38 is in a first position disengaged and away from mandrel 18. In this position eccentric cam 60 is positioned so that the longer dimension 62 is pointing in a downward direction thereby tending to urge carrier member 48 in a downward direction.

Referring now to FIGS. 5 and 7, after plate 16 is inserted into slot 42, mandrel 18 may be rotated in a clockwise direction approximately 180 degrees to a secondary position by the turning of handle 44. This turning of handle 44 causes mandrel to rotate and pull plate 16 past second elongate roller 22 which keeps plate 16 tight against mandrel 18. The turning of the handle also causes each eccentric cam 60 to turn so that the longer dimension 62 of the eccentric cam 60 urges a corresponding carrier member plate 48 in an upward direction causing the face 68' of heater 38 to engage printing plate 16. At this point a user would stop rotation of the handle. An indication device such as a spring loaded ball and cooperating detent (not shown) may be employed to alert the user when to stop rotating. While moving to this position, switch 102 is actuated by pin 103 and power is supplied to heater 38. It is preferable that the heater 38 be turned on at a point prior to engaging plate 16 so that it will have warmed up upon engaging plate 16 in order to reduce the heating time required. The energized heater heats printing plate 16 and preferably presses against plate 16 in order to form a permanent bend on the plate's edge. When the timer of controller 108, which has been started by a signal from thermocouple 114, times out, a signal is generated indicating that heater 38 has been engaged for a sufficient amount of time to properly shape printing plate 16. The user may then turn handle 44 in a counterclockwise direction causing heater 38 to be returned to its first disengaged position away from the mandrel 18. The mandrel 18 is then in its initial position as shown in FIG. 4. Printing plate 16 may now be removed having one of its edges formed.

Figure 8:
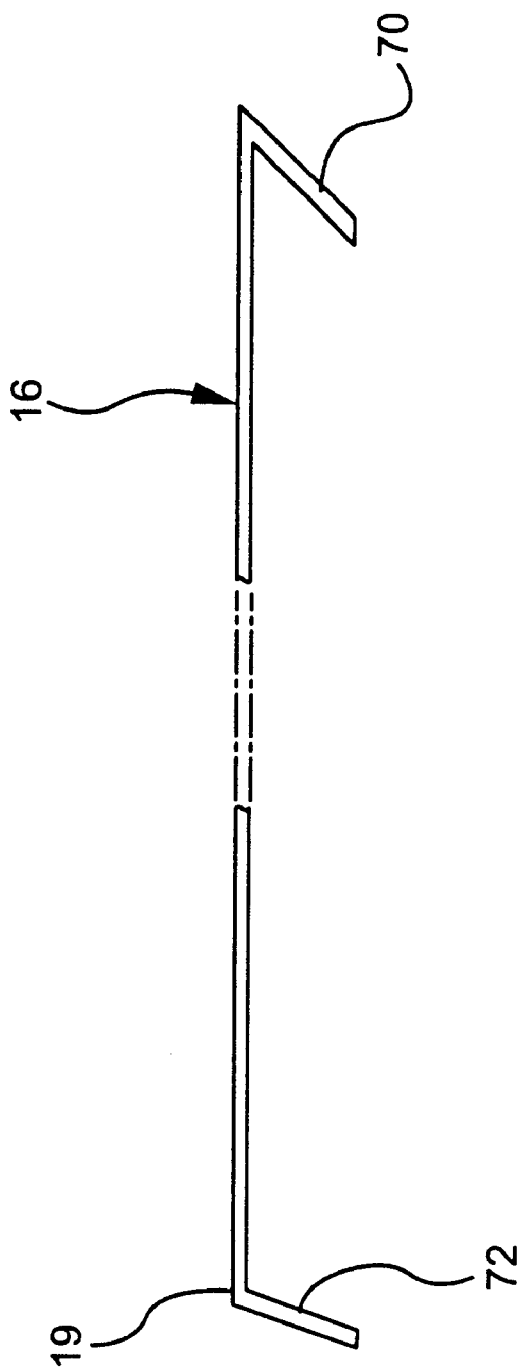
FIG. 8 is a side elevational view showing the leading and trailing edge of a printing plate formed by the plate bender of the present invention.

After bending one edge of printing plate 16, the opposite end of plate 16 may be bent by placing it in substrate retainer slot 42. In order to form the proper bend in the opposite edge, handle 44 and mandrel is turned in a counterclockwise direction past first elongate guide roller 20. As shown in FIG. 6, mandrel 18 may be rotated in a counterclockwise direction so that printing plate 16 is curved about the outer surface 26 of the mandrel 18. This counterclockwise rotation moves heater 38 into its secondary position in which it engages printing plate 16 and the mandrel 18. The position as shown in FIG. 6 is similar to the position as shown in FIG. 5 in that the heater is activated so that printing plate 16 is properly formed around the mandrel 18 and bent. As with the forming of the first printing plate edge described above, the control circuit 100 energizes heater 38 and provides a signal to the user when the printing plate may be removed. In order to remove plate 16 from mandrel 18, handle 44 may be turned in a clockwise direction so that heater 38 is released and mandrel 18 is then brought to its initial position shown in FIG. 4. Plate bender 10 forms two different complimentary bends on the printing plate leading and trailing edges so that plate 16 may be secured to a plate cylinder in a manner well known in the art. FIG. 8 shows both the leading 70 and the trailing 72 edge of printing plate 16 after they have been properly bent by the operation of plate bender 10 as shown in FIGS. 5 and 6, respectively.

The operation required by a user to form the edges of a plate is similar to that required using a prior art three-roller plate bender. Therefore, the present invention requires no special training or instruction in order to use and can be easily incorporated into a printing operation.

In addition, plate bender 10 of the present invention may also be used with a metallic printing plate. One would simply not have to supply power to the heater control circuit. The heater 38 would to be moved into its second position thereby assisting in forming the crease, but no heat would be supplied, as none is needed. Accordingly, the same device can be easily employed to form printing plates made of plastic and metal so that they can be attached to a plate cylinder.

Figure 11:
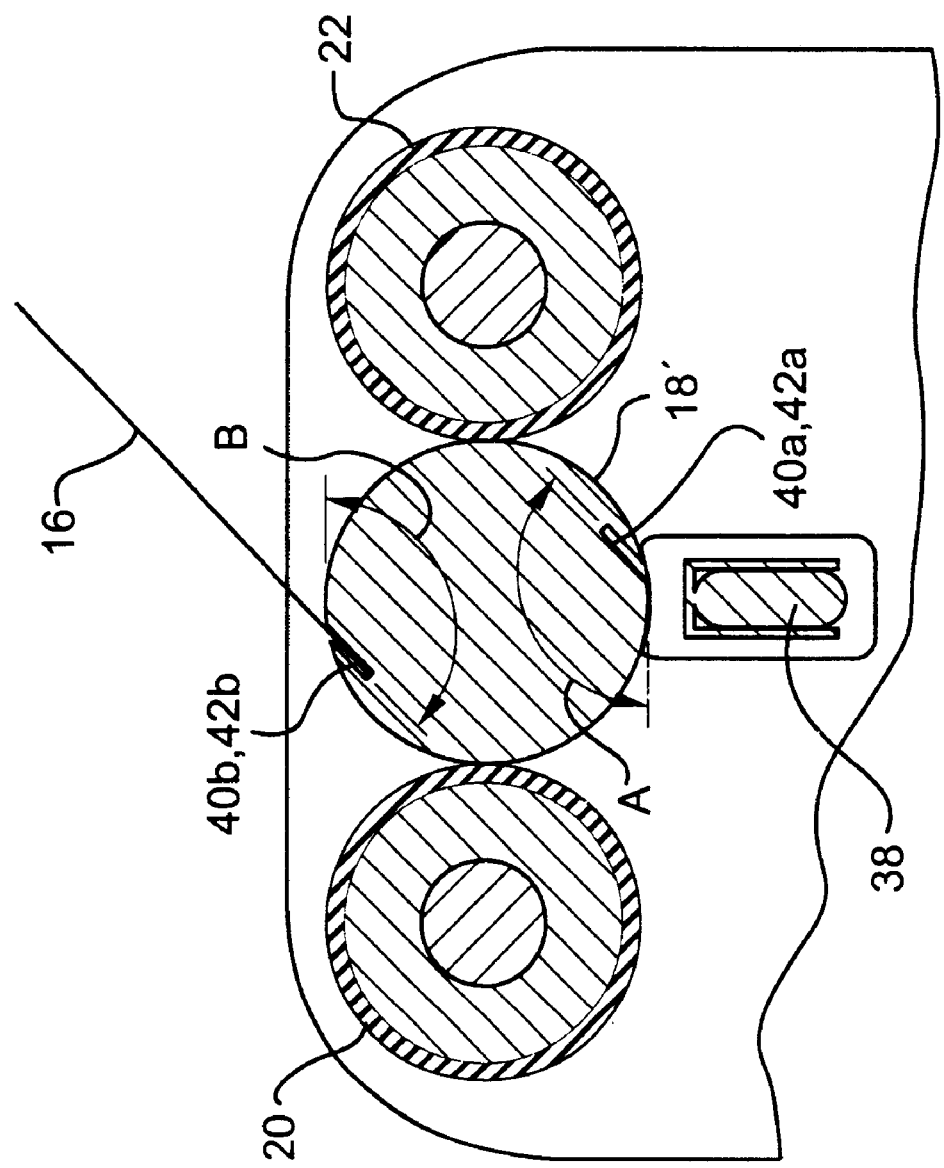
FIG. 11 is a cross-sectional schematic view of an alternative embodiment of the mandrel of the present invention showing a second sheet retainer in the initial position.
Figure 12:
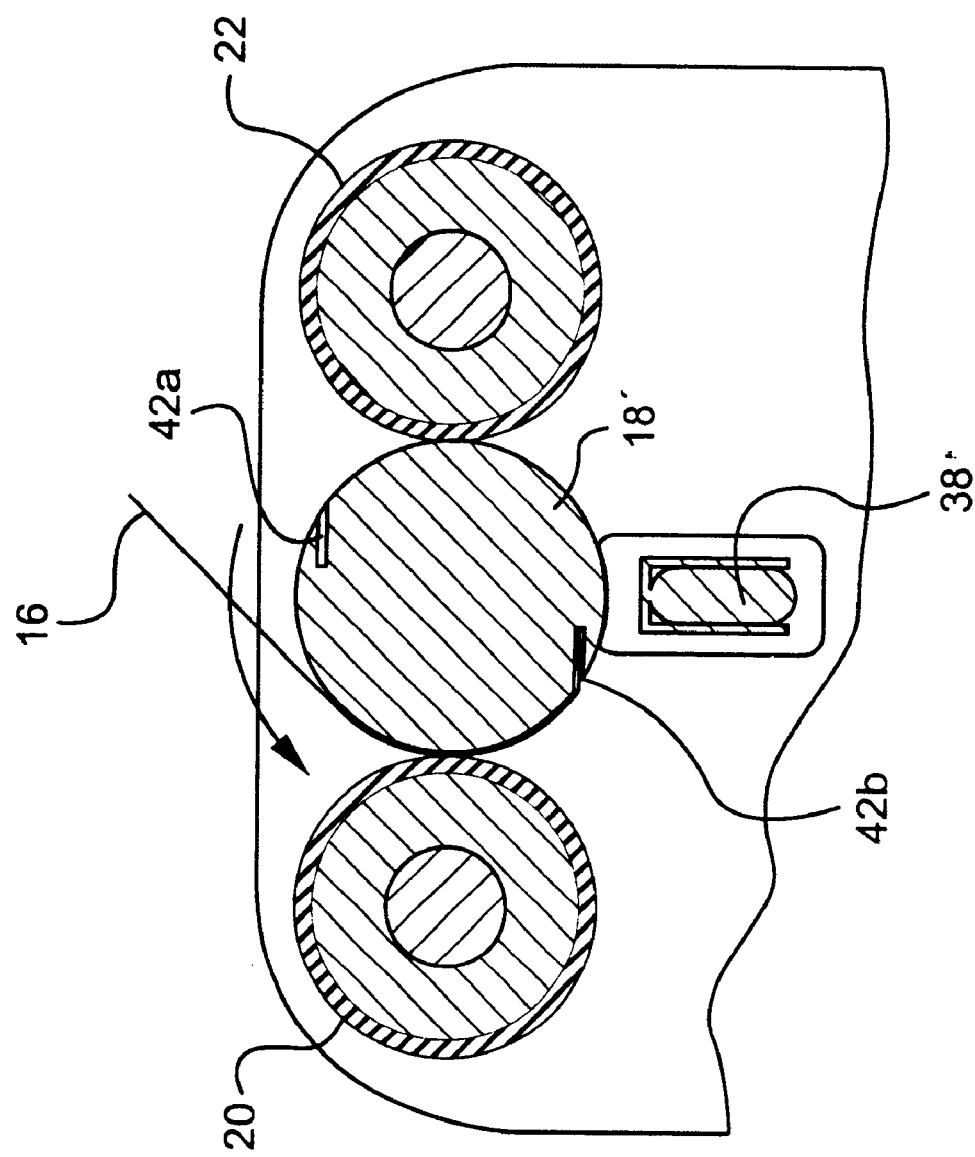
FIG. 12 is a cross-sectional schematic view of the alternative embodiment of the mandrel of FIG. 11 showing a trailing edge being formed on a printing plate.
Figure 13:
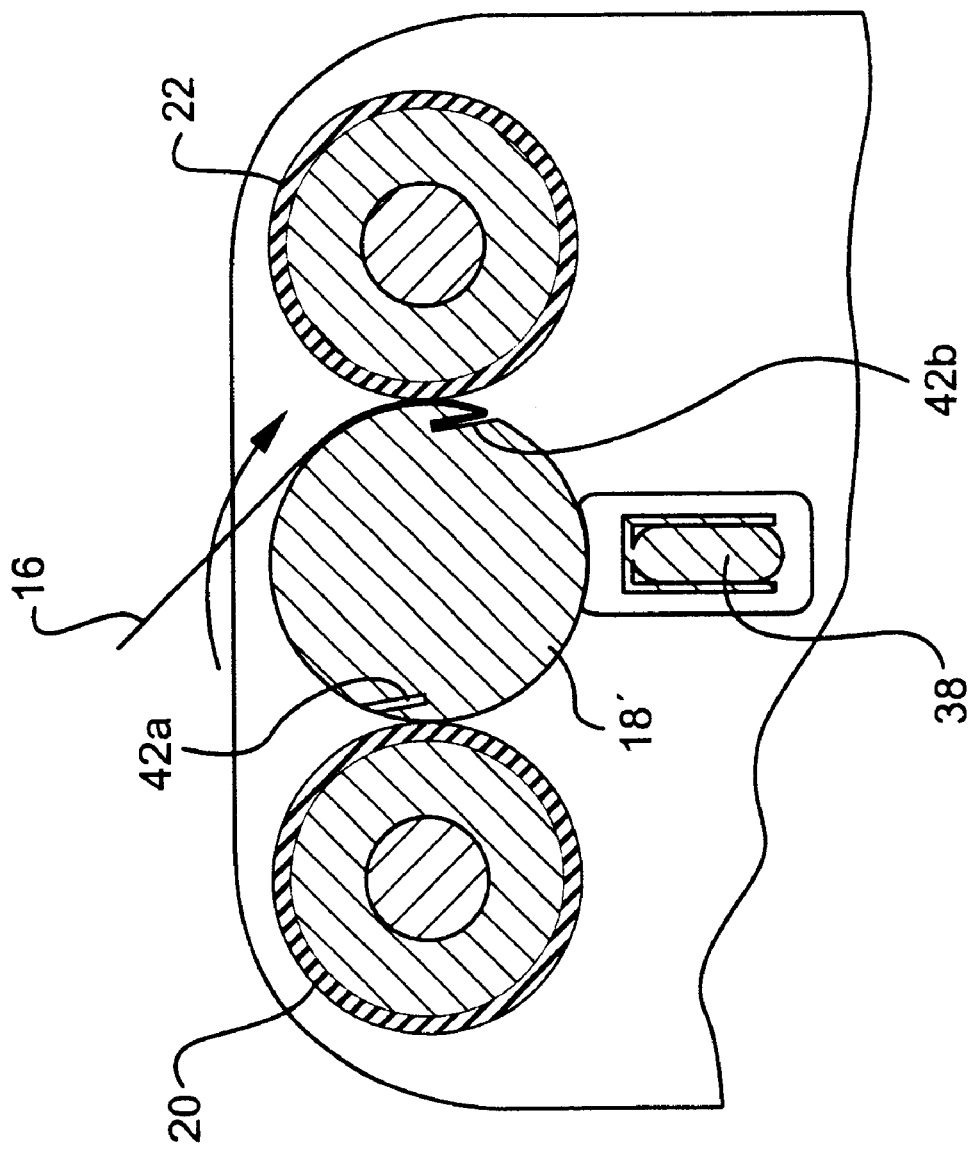
FIG. 13 is a cross-sectional schematic view of the alternative embodiment of the mandrel of FIG. 11 showing a leading edge being formed on the printing plate.

In an alternate preferred embodiment, in order to obtain a more precise bend for both a polyester printing plate and a metallic printing plate, the mandrel of the present invention may include two sheet retainers. With reference to FIGS. 11–13, mandrel 18' may include a first and a second plate retainer 40a and 40b, respectively. First retainer 40a may correspond to the sheet retainer 40 described above and have a slot 42a for receiving the end of a polyester printing plate. Second sheet retainer 40b may include a longitudinal slot 42b sized to receive an end of a printing plate formed of a metallic material such as aluminum. The first and second sheet retainers, 40a and 40b, may be offset from one another by about 180 degrees. Since aluminum is less resilient than polyester, to achieve the same resultant bend angle for both materials, the polyester plate is preferably bent to a greater degree during the forming process then the aluminum plate since the polyester tends to spring back after the plate is removed from the plate bender. While the application of heat allows for permanent deformation of the polyester printing plate, some spring back may occur. Therefore, the angle of polyester plate receiving slot 42a with respect to a tangent of mandrel 18' may be varied from that of aluminum plate receiving slot 42b. For example, in the preferred embodiment the angle A of slot 42a is about 154 degrees and the angle B of slot 42b is about 146 degrees. While the slot angles may differ, the angle of the printing plates, both polyester and aluminum, after formation will be substantially the same so that they can be easily attached to a printing drum. In addition, since polyester tends to stretch more than aluminum during the printing plate edge bending, elongate slot 42a may be slightly sallower than slot 42b so that the resultant lengths of the bent printing plates are the same. In order to alert a user as to which slot to use, mandrel 18' may include indicia, such as a stamped letter or number, placed adjacent to slots 42a and 42b. In addition, it is within the contemplation of the present invention to form the first and second sheet retainers in a variety of depths, thicknesses, and angles to accommodate a particular printing plate and form a desired bend configuration.

In this alternative preferred embodiment, to form the bend on the ends of a polyester or other plastic material printing plate is the same as described above, with regard to the one sheet retainer embodiment as shown for example in FIG. 3. Forming bends on a metallic sheet using slot 42b, requires rotating mandrel 18' clockwise such that slot 42b comes to the top position as shown in FIG. 11. A user may then insert the plate end in to slot 42b and rotate mandrel 18' counterclockwise until slot 42b passes roller 20 which forms the crease as shown in FIG. 12. The rotation would then be reversed to the position shown in FIG. 11 such that the creased edge could be removed. The opposite end of the plate may be inserted in slot 42b and mandrel 18' rotated clockwise passed second roller 22 to form the complementary bend as shown in FIG. 13. There is no need to have the crease area of an aluminum plate to contact the heater as the metallic will become plastically deformed just by the mechanical force exerted by passing between mandrel 18' and one of the rollers.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A printing plate bender for forming shaped edges on a substrate comprising:

a frame;

an elongate mandrel rotatably supported on the frame, the mandrel having a first substrate retainer supported thereon;

a first substrate guide supported on the frame and disposed adjacent the mandrel; and a heater disposed in longitudinal alignment with the mandrel, the heater movably mounted on the frame and being movable between a first position spaced from the mandrel and a second position wherein the heater is in close proximity to a substrate securable to the mandrel, thereby forming the shaped edge on the substrate, the heater being operatively connected to the mandrel such that rotation of the mandrel causes movement of the heater.

2. A printing plate bender as defined in claim 1, wherein the first substrate retainer includes a longitudinally extending slot formed in the mandrel adapted to receive an edge of the substrate.

3. A printing plate bender as defined in claim 1, wherein the mandrel and the heater are operatively connected such that rotation of the mandrel moves the heater between the first and the second position.

4. A printing plate bender as defined in claim 3, wherein the mandrel is connected to a cam and the heater is connected to a cam follower which engages the cam.

5. A printing plate bender as defined in claim 4, wherein the cam is an eccentric cam and the cam follower is an elongated opening configured to receive the cam, such that rotary motion of the cam causes generally linear motion of the cam follower and the heater connected thereto.

6. A printing plate bender as defined in claim 3, wherein the mandrel has a first and second end each being connected to a cam, and the heater having a first and second end each end being connected to a cam follower, and each of the cam followers engaging one of the cams.

7. A printing plate bender as defined in claim 2, wherein the heater is secured at each end to a carrier member which is movable relative to the frame.

8. A printing plate bender as defined in claim 7, further including a cam secured to the mandrel, and wherein at least one of the carrier members includes a cam follower, the cam being in operative engagement with the cam follower.

9. A printing plate bender as defined in claim 3, wherein the frame includes a pair of end brackets secured together by a support member.

10. A printing plate bender as defined in claim 1, further including a handle, and wherein the mandrel includes a shaft extending from an end thereof, and the handle is secured to the shaft to permit the mandrel to be rotated.

11. A printing plate bender as defined in claim 3, wherein the mandrel is rotatable in a first and second opposed directions, and when the mandrel is moved in the first direction, a first edge on the substrate is formed and when the mandrel is rotated in the second direction, a second edge on the substrate is formed.

12. A printing plate bender as defined in claim 7, wherein the mandrel is operatively connected to the heater by a drive mechanism including an eccentric cam formed on one end of the mandrel, and the carrier plate includes a cam follower engagable with the cam such that upon rotation of the cam the heater moves between the first and the second positions.

13. A printing plate bender as defined in claim 1, wherein the first substrate guide includes an elongate first guide roller rotatably supported on the frame and disposed adjacent to the mandrel, the first guide roller being in rolling engagement with the mandrel.

14. A printing plate bender as defined in claim 13, further including a second substrate guide including a second elongate guide roller rotatably supported on the frame and disposed adjacent to the mandrel opposite from the first guide roller, the second guide roller being in rolling engagement with the mandrel.

15. A printing plate bender as defined in claim 1, wherein the mandrel further includes a second sheet retainer supported thereon.

16. A printing plate bender as defined in claim 15, wherein the second sheet retainer includes a longitudinally extending slot formed in the mandrel adapted to receive the edge of the substrate.

17. A printing plate bender as defined in claim 1, further including a controller operatively connected to the heater for controlling the amount of time the heater is energized.

18. A printing plate bender as defined in claim 15, wherein the controller includes a indicator for advising a user when the substrate edge is formed.

19. A printing plate bender as defined in claim 18, further including a switch operatively connected to the controller, the switch being activated upon rotation of the mandrel, and whereupon activation of the switch, the heater is energized.

20. A printing plate bender for forming shaped edges on a printing plate comprising:

a frame;

an elongate mandrel rotatably supported on the frame, the mandrel having a first longitudinally extending slot thereon sized to receive an edge of the printing plate;

a drive shaft extending from the mandrel and connected to an eccentric cam;

a elongate guide roller rotatably supported on the frame and disposed adjacent to the mandrel, the first guide roller being in rolling engagement with the mandrel;

a second elongate guide roller rotatably supported on the frame and disposed adjacent the mandrel opposite from the first guide roller, the second guide roller being in rolling engagement with the mandrel; and a heater disposed in longitudinal alignment with the mandrel, the heater movably mounted on the frame and connected to a cam follower, the cam follower being in operative engagement with the cam, wherein rotation of the cam causes the heater to move from a first position spaced from the mandrel to a second position wherein the heater is in close proximity to the printing plate securable to the mandrel, thereby forming the shaped edge on the printing plate.

21. A printing plate bender as defined in claim 20, wherein the mandrel includes a second longitudinally extending slot thereon sized to receive a printing plate edge.

22. A printing plate bender for forming shaped edges on a substrate comprising:

a frame;

an elongate mandrel rotatably supported on the frame, the mandrel having a substrate retainer supported thereon;

a first guide supported on the frame and disposed adjacent the mandrel; and a heater disposed in longitudinal alignment with the mandrel and movably mounted on the frame; and a linkage means for operatively connecting the mandrel to the heater, whereby rotation of the mandrel moves the heater between a first position spaced from the mandrel and a second position wherein the heater is in close proximity to a substrate securable to the mandrel, thereby forming the shaped edge on the substrate.

23. A printing plate bender as defined in claim 22, wherein said linkage means includes a cam secured to the mandrel and a cam follower secured to the heater, the cam follower being in operative communication with the cam.

24. A printing plate bender comprising:

a frame;

an elongate mandrel rotatably supported on the frame, the mandrel including a printing plate retainer being adapted to releasably secure a printing plate to the mandrel;

a first guide supported on the frame and disposed adjacent the mandrel;

a heater disposed adjacent the mandrel and being movably supported on the frame; and a linkage connecting the mandrel to the heater such that rotation of the mandrel causes the heater to move relative to the mandrel.

25. A printing plate bender as defined in claim 24, wherein the mandrel is rotatable between a first and second position; and the heater is movable between a first position spaced from the mandrel and a second position wherein the heater engages a printing plate securable to the mandrel.

26. A printing plate bender as defined in claim 24, wherein the mandrel is connected to a drive shaft for permitting rotation of the mandrel, and the linkage includes a cam secured to the drive shaft and a cam surface included on a member secured to the heater.

27. A printing plate bender as defined in claim 24, further including a carrier member having an aperture therein defined by the cam surface, the cam being disposed within the aperture and engagable with the cam surface.

28. A printing plate bender as defined in claim 24, further including a control circuit for controlling power to the heater including a switch and a timer, the switch being actuatable upon movement of the heater toward the second position thereby energizing the heater and activating the timer.

29. A printing plate bender for forming shaped edges on a substrate comprising:

a frame;

an elongate mandrel rotatably supported on the frame, the mandrel having a first and second substrate retainer supported thereon;

a first elongate guide roller rotatably supported on the frame and disposed adjacent the mandrel; and a heater disposed in longitudinal alignment with the mandrel, the heater movably mounted on the frame and being movable between a first position spaced from the mandrel and a second position wherein the heater is in close proximity to a substrate securable to the mandrel, thereby forming the shaped edge on the substrate, the heater being operatively connected to the mandrel such that rotation of the mandrel causes movement of the heater.

30. A printing plate bender as defined in claim 30, wherein the first substrate retainer includes a longitudinally extending slot formed in the mandrel adapted to receive the edge of the substrate.

31. A printing plate bender as defined in claim 32, wherein the second substrate retainer includes a longitudinally extending slot formed in the mandrel adapted to receive the edge of the substrate.

32. A printing plate bender as defined in claim 31, wherein the second substrate retainer is off set from the second substrate retainer by about 180 degrees.

33. A printing plate bender as defined in claim 31, wherein the second slot is formed at an angle with respect to a tangent of the mandrel different than that of the first slot.

* * * * *